United States Patent
Zhou

(10) Patent No.: US 11,546,414 B2
(45) Date of Patent: Jan. 3, 2023

(54) METHOD AND APPARATUS FOR CONTROLLING DEVICES TO PRESENT CONTENT AND STORAGE MEDIUM

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/885,130

(22) Filed: May 27, 2020

(65) Prior Publication Data
US 2021/0152628 A1    May 20, 2021

(30) Foreign Application Priority Data
Nov. 18, 2019    (CN) .......................... 201911130180.4

(51) Int. Cl.
| G06F 15/16 | (2006.01) |
| H04L 67/10 | (2022.01) |
| H04L 12/28 | (2006.01) |
| H04W 84/18 | (2009.01) |

(52) U.S. Cl.
CPC .......... H04L 67/10 (2013.01); H04L 12/2803 (2013.01); H04W 84/18 (2013.01)

(58) Field of Classification Search
CPC ..... H04L 67/10; H04L 12/2803; H04W 84/18
USPC ....................................................... 709/224
See application file for complete search history.

(56) References Cited

U.S. PATENT DOCUMENTS

| 5,742,905 A * | 4/1998 | Pepe | ...................... H04L 65/765 455/445 |
| 6,601,101 B1 * | 7/2003 | Lee | ...................... H04L 67/1008 709/227 |
| 7,590,750 B2 * | 9/2009 | Adbo | ...................... H04L 65/612 709/231 |
| 7,739,705 B2 * | 6/2010 | Lee | ...................... H04N 21/4126 725/9 |

(Continued)

FOREIGN PATENT DOCUMENTS

| CN | 103155521 A | 6/2013 |
| CN | 103942021 A | 7/2014 |

(Continued)

OTHER PUBLICATIONS

CN first Office Action in Application No. 201911130180.4, dated Jan. 10, 2022.

(Continued)

Primary Examiner — Alicia Baturay
(74) Attorney, Agent, or Firm — Syncoda LLC; Feng Ma

(57) ABSTRACT

A method for controlling devices to present content includes: determining content to be presented in response to a content request event occurring; determining a content presentation form supported by a presentation device; and providing corresponding presentation content to the presentation device in accordance with a determined presentation form. As such, the current content presentation form can be determined based on the content presentation forms supported by the presentation device, and the content in different presentation forms can be continuously presented, thereby enhancing the user experience.

20 Claims, 4 Drawing Sheets

(56) References Cited

U.S. PATENT DOCUMENTS

| | | | | |
|---|---|---|---|---|
| 8,046,672 | B2* | 10/2011 | Hegde | H04L 67/303 |
| | | | | 715/200 |
| 8,803,817 | B1* | 8/2014 | Froment | G06F 15/0291 |
| | | | | 345/184 |
| 8,868,678 | B2 | 10/2014 | Hildreth et al. | |
| 8,880,627 | B2* | 11/2014 | Davenport | H04L 51/56 |
| | | | | 709/204 |
| 8,989,961 | B2* | 3/2015 | Chien | H04W 76/00 |
| | | | | 455/418 |
| 9,036,529 | B2* | 5/2015 | Erickson | H04L 9/3265 |
| | | | | 370/254 |
| 9,036,632 | B2* | 5/2015 | Erickson | H04L 63/083 |
| | | | | 370/392 |
| 9,124,521 | B2* | 9/2015 | Erickson | H04L 12/2823 |
| 9,154,923 | B2* | 10/2015 | Bai | H04W 4/80 |
| 9,239,740 | B2* | 1/2016 | Zhao | G06F 9/5044 |
| 9,294,798 | B2* | 3/2016 | Sim | H04N 21/8126 |
| 9,584,650 | B2* | 2/2017 | Lee | H04M 1/72463 |
| 9,641,960 | B2* | 5/2017 | Verma | H04L 67/51 |
| 9,715,816 | B1* | 7/2017 | Adler | G06F 3/167 |
| 9,736,667 | B2* | 8/2017 | Kim | H04L 69/08 |
| 9,756,036 | B2* | 9/2017 | Kostiainen | H04L 9/3268 |
| 9,808,709 | B2* | 11/2017 | Cozad | A63F 13/79 |
| 9,872,061 | B2* | 1/2018 | Svendsen | H04N 21/41265 |
| 9,883,353 | B2* | 1/2018 | Ng | H04L 67/12 |
| 9,958,289 | B2* | 5/2018 | Foster | G01C 21/3688 |
| 9,990,129 | B2* | 6/2018 | Yang | G06F 3/0414 |
| 9,992,319 | B2* | 6/2018 | Yoon | H04M 1/6083 |
| 9,999,080 | B2* | 6/2018 | Kim | H04W 4/08 |
| 10,015,740 | B2* | 7/2018 | Su | H04W 52/0209 |
| 10,019,444 | B2* | 7/2018 | Schmidt | G06F 16/48 |
| 10,054,463 | B2* | 8/2018 | Foster | G01C 21/3626 |
| 10,064,081 | B2* | 8/2018 | Lee | H04M 1/72409 |
| 10,073,599 | B2* | 9/2018 | Khoury | G06F 3/1423 |
| 10,116,748 | B2* | 10/2018 | Farmer | H04L 67/12 |
| 10,142,423 | B2* | 11/2018 | Verger | H04L 65/80 |
| 10,194,013 | B2* | 1/2019 | Weinberg | G01C 21/3661 |
| 10,255,016 | B2* | 4/2019 | Abraham | G06F 3/013 |
| 10,277,939 | B2* | 4/2019 | Svendsen | H04N 7/15 |
| 10,322,338 | B2* | 6/2019 | Cozad | A63F 13/67 |
| 10,339,293 | B2* | 7/2019 | Yang | H04M 1/67 |
| 10,397,627 | B2* | 8/2019 | Gao | H04N 21/472 |
| 10,512,038 | B2* | 12/2019 | Su | H04W 48/16 |
| 10,542,405 | B2* | 1/2020 | Srivatsa | H04W 8/005 |
| 10,565,158 | B2* | 2/2020 | Freitas | G06F 16/27 |
| 10,567,477 | B2* | 2/2020 | Sumner | G06F 3/04842 |
| 10,579,293 | B2* | 3/2020 | McGavran | G06N 5/022 |
| 10,594,850 | B2* | 3/2020 | Weinberg | G06F 3/1454 |
| 10,623,549 | B2* | 4/2020 | Yoon | H04M 1/6083 |
| 10,652,337 | B2* | 5/2020 | Brusco | H04M 9/00 |
| 10,740,719 | B2* | 8/2020 | Kaweske | G16H 20/10 |
| 10,748,546 | B2* | 8/2020 | Kim | G10L 15/30 |
| 10,768,979 | B2* | 9/2020 | Williams | G06F 9/546 |
| 10,769,570 | B2* | 9/2020 | Lu | G06N 20/00 |
| 10,805,358 | B2* | 10/2020 | Parikh | H04L 65/61 |
| 10,819,793 | B2* | 10/2020 | Rose | H04L 41/0806 |
| 10,824,322 | B2* | 11/2020 | Cranfill | G06F 3/0483 |
| 10,866,731 | B2* | 12/2020 | Yang | G06F 1/163 |
| 2003/0055867 | A1* | 3/2003 | King | H04L 69/329 |
| | | | | 709/204 |
| 2013/0297835 | A1* | 11/2013 | Cho | G06F 3/0634 |
| | | | | 710/14 |
| 2014/0120829 | A1* | 5/2014 | Bhamidipati | H04N 21/41265 |
| | | | | 455/3.06 |
| 2014/0298382 | A1* | 10/2014 | Jo | H04N 21/4725 |
| | | | | 725/34 |
| 2014/0372540 | A1* | 12/2014 | Libin | H04L 12/1822 |
| | | | | 709/206 |
| 2014/0376405 | A1* | 12/2014 | Erickson | H04L 12/2803 |
| | | | | 370/254 |
| 2015/0012826 | A1* | 1/2015 | Tengstrand | G06F 3/04842 |
| | | | | 715/761 |
| 2015/0016407 | A1* | 1/2015 | Erickson | H04L 9/30 |
| | | | | 370/329 |
| 2015/0023293 | A1* | 1/2015 | Erickson | H04L 9/14 |
| | | | | 370/329 |
| 2015/0023294 | A1* | 1/2015 | Erickson | H04L 45/74 |
| | | | | 370/329 |
| 2015/0023339 | A1* | 1/2015 | Erickson | H04L 67/12 |
| | | | | 370/338 |
| 2015/0145750 | A1* | 5/2015 | Shin | G09G 5/391 |
| | | | | 345/2.2 |
| 2015/0149781 | A1* | 5/2015 | Logue | H04L 9/3247 |
| | | | | 713/168 |
| 2015/0227492 | A1* | 8/2015 | Bai | G06F 3/04842 |
| | | | | 715/762 |
| 2015/0249605 | A1* | 9/2015 | Erickson | H04L 67/12 |
| | | | | 370/254 |
| 2015/0249728 | A1* | 9/2015 | Erickson | H04W 72/0493 |
| | | | | 709/217 |
| 2015/0257190 | A1* | 9/2015 | Erickson | H04L 9/3247 |
| | | | | 370/338 |
| 2015/0350297 | A1* | 12/2015 | Yang | G06F 3/0484 |
| | | | | 715/740 |
| 2015/0382394 | A1* | 12/2015 | Tiedje | H04W 76/18 |
| | | | | 370/216 |
| 2016/0041821 | A1* | 2/2016 | Erickson | H04L 61/00 |
| | | | | 717/171 |
| 2016/0050130 | A1* | 2/2016 | Ljung | H04N 21/25833 |
| | | | | 709/224 |
| 2016/0227506 | A1* | 8/2016 | Erickson | H04L 69/22 |
| 2016/0263996 | A1* | 9/2016 | Gerlach | G06F 3/1454 |
| 2017/0070491 | A1* | 3/2017 | Logue | H04W 84/12 |
| 2017/0105037 | A1* | 4/2017 | Svendsen | H04N 21/2143 |
| 2017/0272416 | A1* | 9/2017 | Erickson | H04W 76/10 |
| 2017/0336931 | A1* | 11/2017 | Klaucke | G06F 3/0482 |
| 2018/0084297 | A1* | 3/2018 | Svendsen | H04N 21/2143 |
| 2018/0262605 | A1* | 9/2018 | Yoon | H04M 1/72412 |
| 2019/0122121 | A1* | 4/2019 | Yu | A61K 38/08 |
| 2019/0245836 | A1* | 8/2019 | Erickson | H04W 40/246 |
| 2019/0295547 | A1* | 9/2019 | Gandhi | H04W 12/06 |
| 2019/0302952 | A1* | 10/2019 | Wang | G06F 3/0416 |
| 2020/0236560 | A1* | 7/2020 | Zhao | H04W 16/10 |
| 2020/0241486 | A1* | 7/2020 | Hong | G05B 13/0265 |
| 2020/0374149 | A1* | 11/2020 | Bernal Barros | H04L 67/12 |
| 2020/0409383 | A1* | 12/2020 | Maunder | G05D 1/0221 |

FOREIGN PATENT DOCUMENTS

| | | |
|---|---|---|
| CN | 105407373 A | 3/2016 |
| CN | 105898233 A | 8/2016 |

OTHER PUBLICATIONS

Partial European Search Report in Application No. 20182001.6, dated Jan. 11, 2021.

Van Deventer M Oskar et al: "Standards for multi-steam and multi-device media synchronization", IEEE Communications Magazine, IEEE Service Center, Piscataway, US, vol. 54, No. 3, Mar. 1, 2016, pp. 16-21, XP011603195.

* cited by examiner

METHOD AND APPARATUS FOR CONTROLLING DEVICES TO PRESENT CONTENT AND STORAGE MEDIUM

CROSS-REFERENCE TO RELATED APPLICATION

This application claims priority to Chinese Patent Application No. 201911130180.4 filed on Nov. 18, 2019, the disclosure of which is hereby incorporated by reference in its entirety.

BACKGROUND

With the advancement of technologies, smart homes have been rapidly developed and brought convenient experience to users' lives and work. A smart home system can include multiple devices of different types.

SUMMARY

The present disclosure generally relates to the field of display technologies, and more specifically to a method for controlling devices to present content, an apparatus for controlling devices to present content, and a storage medium.

According to a first aspect of the embodiments of the present disclosure, there is provided a method for controlling devices to present content, the method comprising: determining content to be presented in response to a content request event occurring; determining a content presentation form supported by a presentation device; and providing corresponding presentation content to the presentation device in accordance with a determined presentation form.

In some embodiments, the method for controlling devices to present content further includes: determining at least one content presentation form corresponding to an application scenario based on the application scenario in which the user is currently located; and generating presentation content respectively corresponding to the at least one content presentation form; or sending content to be presented to an edge-side device and generating presentation content respectively corresponding to the at least one content presentation form by the edge-side device; or generating presentation content respectively corresponding to the at least one content presentation form and sending the generated presentation content to an edge-side device, wherein the edge-side device includes a device through which the presentation device is networked.

In some embodiments, the providing corresponding presentation content to the presentation device in accordance with a determined presentation form includes: determining presentation content corresponding to a content presentation form supported by the presentation device from the generated presentation content corresponding respectively to at least one content presentation form; and providing the determined presentation content to the presentation device.

In some embodiments, there are included at least two presentation devices responsive to content requests; and the determining content presentation form supported by presentation device includes: determining presentation forms which are set in advance and corresponding respectively to when at least two presentation devices cooperate to present the content; and the providing corresponding presentation content to the presentation device in accordance with the determined presentation form includes: determining presentation content corresponding to content presentation forms corresponding respectively to at least two presentation devices, from the generated presentation content corresponding respectively to at least one content presentation form, based on the determined content presentation forms respectively corresponding to the at least two presentation devices, and correspondingly providing to the at least two presentation devices.

In some embodiments, the method further includes: providing respectively presentation timing control instructions to the at least two presentation devices, to make the at least two presentation devices implement synchronous presentation of presentation content in different presentation forms.

In some embodiments, in response to that a user mobile switching event occurs during a response to the content request after a content request event occurred; the method further includes determining a successive point when a presentation device after user mobile switching presents continuously content presented by a presentation device before mobile switching, wherein mobile switching event includes space switching and/or application scenarios switching; and providing the presentation content from the successive point to the presentation device after user mobile switching, in accordance with a content presentation form supported by the presentation device after user mobile switching; or providing presentation content to the presentation device after user mobile switching in accordance with the content presentation form supported by the presentation device after user mobile switching, and controlling the presentation device after user mobile switching to present the provided presentation content from the successive point.

In some embodiments, for a case that mobile switching is an application scenario switching, before providing the presentation content to the presentation device after switching, the method further includes: determining at least one content presentation form corresponding to the application scenario after switching, based on an application scenario after user switching; and generating presentation content corresponding respectively to at least one content presentation form corresponding to the application scenario after switching; or generating a corresponding form of presentation content for the content presentation form that does not exist, in response to that in the at least one determined content presentation form, there is a content presentation form that does not exist in a content presentation form corresponding to an application scenario before switching.

In some embodiments, the determining a content presentation form supported by a presentation device includes: determining a priority of each content presentation form supported by the presentation device; and determining a content presentation form with the highest priority as a content presentation form supported by the presentation device.

According to a second aspect of the embodiments of the present disclosure, a method for controlling devices to present content is provided, and the method for controlling devices to present content includes: reporting content to be presented to the cloud in response to a content request event occurring; and receiving and presenting presentation content with its own supported presentation form sent by the cloud.

In some embodiments, the method further includes: receiving a timing control instruction sent by the cloud; and presenting synchronously presentation content in accordance with timing controlled by the timing control instruction.

In some embodiments, the method further includes: receiving presentation successive point information sent by the cloud; and presenting the presentation content from the presentation successive point.

According to a third aspect of the embodiments of the present disclosure, there is provided an apparatus for controlling devices to present content comprising: a determining component configured to determine content to be presented in response to a content request event occurring, the determining component is further configured to determine a content presentation form supported by a presentation device; and a providing component configured to provide corresponding presentation content to the presentation device in accordance with the determined presentation form.

In some embodiments, the apparatus further includes a generating component. The determining component is further configured to determine at least one content presentation form corresponding to an application scenario based on to the application scenario in which the user is currently located, the generating component is configured to generate presentation content corresponding respectively to the at least one content presentation form; or send content to be presented to an edge-side device, and generate presentation content corresponding respectively to at least one content presentation form by the edge-side device, or generate presentation content respectively corresponding to at least one content presentation form and send the generated presentation content to an edge-side device, wherein the edge-side device includes a device through which a presentation device is networked.

In some embodiments, the providing component provides corresponding presentation content to the presentation device in accordance with a determined presentation form in the following manner: determining presentation content corresponding to a content presentation form supported by the presentation device from the generated presentation content corresponding respectively to at least one content presentation form; and providing the determined presentation content to the presentation device.

In some embodiments, there are included at least two responsive presentation devices responsive to content requests, the determining component determines content presentation forms supported by presentation devices in the following manner: determining presentation forms which are set in advance and corresponding respectively to when the at least two presentation devices cooperate to present content; and the providing component provides corresponding presentation content to the presentation device in accordance with the determined presentation form in the following manner: determining presentation content corresponding to content presentation forms corresponding respectively to at least two presentation devices from the generated presentation content corresponding respectively to at least one content presentation form based on the determined content presentation forms corresponding respectively to the at least two presentation devices, and correspondingly providing to the at least two presentation devices.

In some embodiments, the providing component is further configured to provide respectively presentation timing control instructions to the at least two presentation devices, to make the at least two presentation devices implement synchronous presentation of presentation content in different presentation forms.

In some embodiments, the determining component is further configured to determine a successive point a presentation device after user mobile switching presents continuously content presented by a presentation device before mobile switching, in response to that a user mobile switching event occurs during a response to the content request after the content request event occurred, wherein mobile switching event includes space switching and/or application scenarios switching, a providing component is further configured to provide presentation content from the successive point to the presentation device after user mobile switching, in accordance with a content presentation form supported by the presentation device after user mobile switching, or provide presentation content to the presentation device after user mobile switching in accordance with a content presentation form supported by the presentation device after user mobile switching and control the presentation device after user mobile switching to present the provided presentation content from the successive point.

In some embodiments, the determining component is further configured to determine at least one content presentation form corresponding to the application scenario after switching, based on the application scenario after user switching, before providing the presentation content to the presentation device after switching for a case that mobile switching is an application scenario switching; and the generating component is further configured to generate presentation content corresponding respectively to the at least one content presentation form corresponding to the application scenario after switching; or generate a corresponding form of presentation content for an content presentation form that does not exist in response to that there is the content presentation form that does not exist in content presentation forms corresponding to application scenario before switching, in the at least one determined content presentation form.

In some embodiments, the determining component determines a content presentation form supported by a presentation device in the following manners: determining a priority of each content presentation form supported by the presentation device; and determining a content presentation form with the highest priority as a content presentation form supported by the presentation device.

According to a fourth aspect of the embodiments of the present disclosure, there is provided an apparatus for controlling devices to present content comprising: a reporting component configured to report content to be presented to the cloud, in response to a content request event occurring; a receiving component configured to receive presentation content with its own supported presentation form sent by the cloud; and a presenting component configured to present presentation content.

In some embodiments, the receiving component is further configured to receive a timing control instruction sent by the cloud, and the presenting component is configured to present synchronously presentation content in accordance with timing controlled by a timing control instruction.

In some embodiments, the receiving component is further configured to receive presentation successive point information sent by the cloud, and the presenting component is further configured to present the presentation content from the presentation successive point.

According to a fifth aspect of the embodiments of the present disclosure, there is provided an apparatus for controlling devices to present content comprising a processor and memory storing instructions executable by the processor, wherein the processor is configured to execute any one of the foregoing methods for controlling devices to present content.

According to a sixth aspect of the embodiments of the present disclosure, there is provided a non-transitory computer-readable storage medium, and when instructions in the storage medium are executed by a processor of a mobile terminal, the mobile terminal is enabled to execute any one of the foregoing methods for controlling devices to present content.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Content presentation by smart home devices can be a relatively intuitive way for reflecting the value of content. However, the device capabilities in the smart homes are different, and content presentation forms of the presented content are also different. When using smart home devices, users often need to switch among different smart home devices for content presentation in different content presentation forms. However, when users switch among different smart home devices for content presentation in different content presentation forms, there is often a phenomenon of delay of switching to display the presented content, which affects the user experience.

The devices involved in various embodiments of the present disclosure can be smart home devices, such as smart video and audio playback devices, smart appliances, gateway devices, and smart terminals, etc.

A smart home can be an implementation scenario of Artificial Intelligence (AI) in the Internet of Things (IoT) (AIoT, or AI+IoT). AIoT is the Internet of Things enabled by AI, big data, and cloud computing, and the integration of smart home applications and AI capabilities can enable the IoT technologies and AI to form an intelligent ecosystem.

Figure 1:
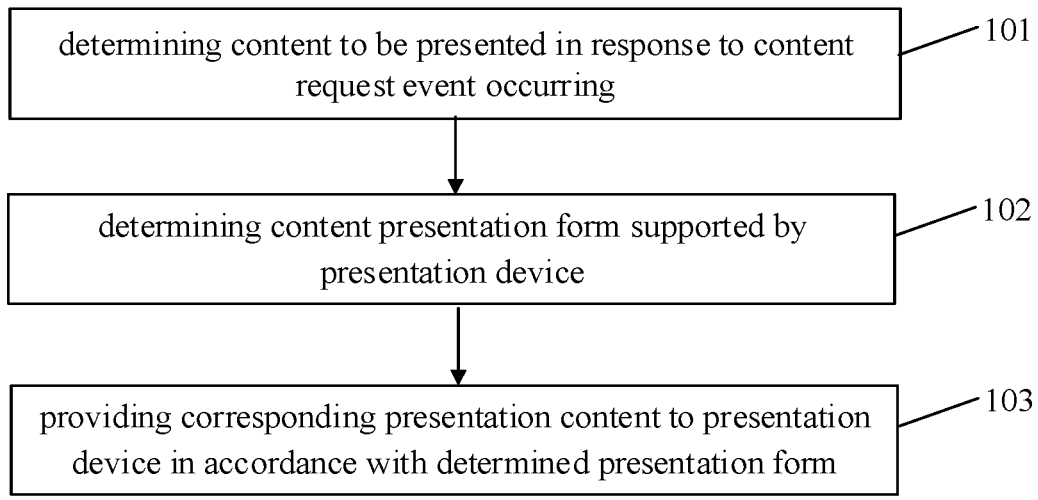
FIG. 1 is a flowchart showing a method for controlling devices to present content according to some exemplary embodiments of the present disclosure.

FIG. 1 is a flowchart showing a method for controlling devices to present content according to some exemplary embodiments of the present disclosure, and as shown in FIG. 1, the method for controlling devices to present content is applied to a smart home system. Referring to FIG. 1, the method for controlling devices to present content includes the following steps.

In step S101, the content to be presented is determined in response to a content request event occurring.

The cloud or the edge-side device determines the content that the device needs to present, in response to a device content request event occurring.

It may be initiated by the user to wake up and start the device, and the device sends a content request. It may also be that the smart home system detects a change in the position of the user and usage status, switches from the previous device to the current device, and the current device issues a content request.

In some embodiments of the present disclosure, the content to be presented can be determined based on a user control instruction. For example, if the user control instruction is to watch some content on the television, it can be determined that the television needs to present the content, and the content to be presented is video. When the user control instruction includes the watching time, for example, "I want to watch the movie "Great, My Country"", the content presented is a video of the movie "Great, My Country". If the user control instruction is to use a speaker to play music, it can be determined that the content which the speaker needs to present is audio; and if the user control instruction is to use a mobile phone to open email or other information, it can be determined that the content which the mobile phone needs to present is text.

In some embodiments of the present disclosure, the content to be present by the device can also be determined based on changes in user application scenarios, usage status, and the like. When the user enters the room from the outside or when a positional movement occurs indoors, the device for presenting content changes. For example, during the process that the user enters the room from the outdoor, if the user is playing music, the playback device can be switched from a portable device to an indoor video and audio playback device, and thus it is determined that the indoor video and audio playback device needs to present content.

In step S102, a content presentation form supported by the presentation device is determined.

The content presentation forms supported by the device can include audio, video, voice, sound, text prompts, and the like.

The device supports the corresponding content presentation form based on its own presentation capability, that is, the device corresponds to the supported content presentation form.

For example, the presentation device is a speaker with display screen, the content presentation forms that the speaker with display screen can support include playing long and short videos, playing long and short voices, and displaying long and short text prompts.

In another example, the presentation device is a speaker without display screen, the content presentation forms that the speaker without display screen can support include playing long and short voices.

For still another example, the presentation device is a sports watch or a sports bracelet, the content presentation forms that the sports watch or the sports bracelet can support include playing long and short voices, and displaying short text prompts.

In step S103, the corresponding presentation content is provided to the presentation device in accordance with a determined presentation form.

Therefore, the presentation device presents the content in accordance with the determined presentation form.

According to the embodiments of the present disclosure, the presentation content is determined in advance according to the content presentation form supported by the presentation device, and when it is determined that a content request event occurs, the corresponding presentation content is provided to the presentation device in accordance with the determined presentation form, and continuous presentation of the content in different presentation forms is implemented, thereby enhancing the user experience.

In some embodiments, at least one content presentation form corresponding to the application scenario is determined based on the application scenario in which the user is currently located, and the presentation content corresponding respectively to the at least one content presentation form is generated.

The corresponding content presentation form is also different based on that the application scenarios where the user is located are different.

For example, the application scenario where the user is located can be divided into daily indoor scenarios, outdoor scenarios, sports scenarios, vehicle scenarios, and the like. The devices that may be included in the daily indoor scenarios may include televisions, smart speakers, and the like, the content presentation forms corresponding to the devices may include playing long and short videos, playing long and short audios, voice prompts, long and short text prompts, and the like, to give the user an experience of enjoying rich video and audio playback modes.

When the application scenario where the user is located is a sports scenario, the presentation device used by the user may be a smart watch or a bracelet, and due to the limitation of the device, it is not convenient for the user to receive a relatively long content presentation form, and the corresponding presentation way may be long and short voices or short text prompts.

According to at least one content presentation form, the presentation content corresponding respectively to the at least one content presentation form is generated.

As described in the above examples, when the located application scenario is a daily indoor scenario, the presentation content corresponding respectively to the presentation ways such as playing long and short videos, playing long and short audios, voice prompts, long and short text prompts, etc., that is, long and short videos, long and short audios, voice, long and short text, is generated.

When the located application scenario is a sports scenario, long and short voices or long and short text are generated.

In some embodiments, the content to be presented is sent to the edge-side device, and the edge-side device generates the presentation content corresponding respectively to the at least one content presentation form.

For example, the content to be presented is a song, the content presentation forms include: playing long and short videos, playing long and short voices, and displaying long and short text prompts and voice prompts.

The edge-side device generates the presentation content corresponding respectively to the content presentation forms such as the music TV of the song, the audio files of the song, the lyrics of the song, the songwriter of the song, the artist information, and the album cover of the song, etc. The computing power of the edge-side devices is used sufficiently to save the network resources.

The edge-side devices include devices through which the presentation device is networked. In the embodiments of the present disclosure, the edge-side device can be a device in a smart home system with analysis, calculation, and processing capabilities, such as a gateway device or other smart appliances.

The presentation content corresponding respectively to the at least one content presentation form is generated in the cloud, such that the calculation capability of the cloud can be used sufficiently, and the processing speed of the presentation content can be increased, to further enhance the user experience.

In some embodiments, the presentation content corresponding respectively to the at least one content presentation form is generated, and the generated presentation content is sent to the edge-side device.

The edge-side device can store the generated presentation content so as to provide it to the presentation device, thereby further saving the time for providing the presentation content to the presentation device, and reducing the waiting of the user.

In some embodiments, the presentation content corresponding to the content presentation form supported by the presentation device is determined from the generated presentation content corresponding respectively to the at least one content presentation form. The determined presentation content is provided to the presentation device.

The cloud or the edge-side device provides the determined presentation content to the presentation device based on the content presentation form supported by the controlled presentation device.

For example, the content to be presented is a song, the content presentation forms include: playing long and short videos, playing long and short voices, and displaying long and short text prompts and voice prompts. The generated content presentation forms include the music TV of the song, the audio files of the song, the lyrics of the song, the songwriter of the song, the artist information, the album cover of the song, and the like.

The presentation device can include, for example, televisions, speakers with display screen, and speakers without display screen.

The cloud or the edge-side device provides the music TV of the song, the audio files of the song, the lyrics of the song, the songwriter of the song, the artist information, the album cover of the song, etc. to the televisions or the speakers with display screen. The audio files of the song are provided to the speakers without display screen.

The determined presentation content is provided to the presentation device, and there is a corresponding relationship between the content presentation form of the presentation content and the presentation device, so that when the presentation device determines that it is needed to present the content, the required presentation content can be obtained directly without waiting for the presentation content to be generated.

In some embodiments, there are included at least two presentation devices responsive to the content request. The presentation forms which are set in advance and corresponding respectively to when the at least two presentation devices cooperate to present the content are determined.

The presentation forms corresponding respectively to when at least two presentation devices cooperate to present the content can be set in advance as required.

For example, when the presentation device responsive to the content request includes a smart album and the smart speaker, the smart album and the smart speaker cooperate to present the content.

Among the various content presentation forms supported by the smart album, the content presentation form can be playing long videos, short videos, sounds, and text prompts, and among the various content presentation forms supported by the smart speaker, the presentation form can be playing long audios and short audios.

Based on the determined content presentation forms corresponding respectively to the at least two presentation devices, the presentation content corresponding to the content presentation forms corresponding respectively to the at least two presentation devices is determined from the generated presentation content corresponding respectively to the at least one content presentation form, and is correspondingly provided to the at least two presentation devices.

The predetermined presentation forms can be set based on the customary presentation items corresponding to the at least two presentation devices, and the two predetermined presentation forms are, for example, playing long videos by the smart album and playing long audios by the smart speaker. The long audios are provided to the smart speaker and the long videos are provided to the smart album, so that the smart album and the smart speaker cooperate to present the content.

In some embodiments, the presentation timing control instructions are provided respectively to the at least two presentation devices, so that the at least two presentation devices implement synchronous presentation of the presentation content in different presentation forms.

It may be referred to as timing control to apply temporal control to an operation signal. When the at least two presentation devices cooperate to present presentation content in different presentation forms, in order to implement synchronous presentation, the presentation timing control instructions are provided to the at least two presentation devices.

The executing processes of the timing control instructions by the at least two presentation devices are performed in chronological order, that is, the presentation content in different presentation forms is presented by the at least two presentation devices in chronological order. The timing control instruction provides various operation timing signals to the at least two presentation devices, so that the at least two presentation devices presents the content based on the presentation timing control instruction.

In some embodiments, a successive point when the presentation device after user mobile switching presents continuously the content presented by the presentation device before mobile switching is determined, in response to that a user mobile switching event occurs during a response to the content request after the content request event occurred, wherein mobile switching event includes space switching and/or application scenarios switching.

In some embodiments of the present disclosure, a user mobile switching event may occur during the response to the content request based on changes in the user application scenario, usage status and the like. In response to that the content request event occurred, switching of the presentation devices corresponding to the user mobile switching event may occur.

Mobile switching events include space switching, such as when a user enters the room from the outside, or when a positional movement occurs indoors.

Mobile switching event further includes application scenario switching, for example, switching from an outdoor sports scenario to an indoor scenario. In accordance with the content presentation form supported by the presentation device after user mobile switching, the presentation content is provided to the presentation device after user mobile switching, from the successive point.

The current application scenario may be determined based on the attributes of the current device itself, device network connection status information, geographic location information, and the like. For example, if the current device is the smart speaker, and is connected to a Wi-Fi network, the user is likely to be in an indoor environment, and it is determined that the current application scenario is the daily indoor scenario. As another example, if the current device is a smart watch or a smart bracelet, is connected to a mobile network, and the GPS positioning is a park or a stadium, it is determined that the user application scenario is the outdoor sports scenario.

For example, during the process of that the user enters the room from the outdoor, if the user is playing music, the playback device can be switched from a portable device to an indoor video and audio playback device, and it is determined that the indoor video and audio playback device needs to present content.

It may be understood that the content which the indoor audio and video playback device needs to present includes a playback point of the music played by the portable device, which can be obtained through the cloud in the smart home system or the edge-side device of the playback device and the presentation device before mobile switching.

The cloud or the edge-side device can determine the successive point when the presentation content is continuously presented through the playback status of the presentation device before mobile switching, and then the presentation device after mobile switching performs continuous playback from the playback point of the presentation device before mobile switching to implement continuous presentation of the content in different presentation forms.

As the above examples show, the user uses a mobile phone to play music for one minute and forty seconds, and the system detects that the user enters the room and the presentation device needs to be switched. The indoor audio and video playback device includes a television, that is, it is determined that the television is used to continuously play music, and the content presented is the MTV of the music.

In accordance with the content presentation form supported by the presentation device after user mobile switching, the presentation content is provided to the presentation device after user mobile switching, and the presentation device after user mobile switching is controlled to present the presentation content from the successive point.

The edge-side device of the mobile phone in the smart home system, such as a router, can obtain the playback status of the music played by the mobile phone, i.e., the progress of current playback. The cloud can obtain the playback successive point of the presentation device after mobile switching, by the edge-side device, that is, the music MTV resumes playing on the television from one minute and forty seconds, thereby giving users the effect of continuous content presentation.

In some embodiments, for a case that mobile switching is an application scenario switching, at least one content presentation form corresponding to the application scenario after switching is determined based on the application scenario after user switching prior to providing the presentation content to the presentation device after switching.

For example, the presentation device before switching is an in-vehicle navigation device, and it can be estimated that the user application scenario is an in-vehicle scenario based on the attributes of the in-vehicle navigation device through which the user sends the control instruction and the networking status of the device.

The user controls the in-vehicle navigation device to play a certain song, the application scenario before switching is the in-vehicle scenario. After determining that the application scenario is the in-vehicle scenario, at least one content presentation form corresponding to the in-vehicle scenario can be determined. For example, the at least one content presentation form may include playing long and short audios, long and short videos, long and short voices, text information, and the like.

The presentation content is determined in advance, based on a list of content presentation forms, that is, the audio files, video files, track information, songwriter, lyrics information, etc. corresponding to the song are obtained, such that the presentation content in the corresponding presentation form can be directly issued to the device after switching, when switching between different devices. Compared with a situation that the presentation content in the presentation form, supported by the device after switching, is firstly prepared after the switching occurs and then the presentation content is presented, the content of the device after switching is presented more timely, the user experience is better, and the processing efficiency is improved.

The cloud or the edge-side device determines the switching of the application scenarios through the user control instruction or by detecting a current position of the user or usage status of the device, and determines at least one content presentation form corresponding to the application scenario after switching, based on the application scenario after user switching.

The presentation content corresponding respectively to the at least one content presentation form corresponding to the application scenario after switching is generated.

In response to that in the at least one determined content presentation form, there is a content presentation form that does not exist in a content presentation form corresponding to an application scenario before switching, a corresponding form of presentation content is generated for the content presentation form that does not exist Description can be made to the above examples, during the process that the user stops driving and enters the room after parking, it is detected that the application scenario after switching is the indoor scenario, as the at least one content presentation form of the indoor scenario, there may be included in the scenario such devices as a television, smart speakers, etc., the content presentation forms corresponding to the devices include playing long and short videos, playing long and short audios, voice prompts, long and short text prompts, and the like, and the playing long videos (which can be provided by the television) may not be available in the in-vehicle scenario, all the content presentation forms corresponding to the indoor scenarios can be generated in advance, or only the content corresponding to the long video playback can be generated (because the presentation form is not available in the in-vehicle scenario, and the presentation content in other presentation forms in the in-vehicle scenario can be used continuously), so that the content presentation can be seamlessly switched when the user switches to the indoor scenario, which provides a rich video and audio playback experience to the user.

In some embodiments, the at least one content presentation form corresponding to the application scenario can be set in advance.

In some embodiments of the present disclosure, a list of the content presentation forms includes one or more content presentation forms. For example, the user application scenario is the daily indoor scenario, and a list of the content presentation forms corresponding to the application scenario is established based on the types of devices in the room of the home and the content presentation forms of the devices. The list of the content presentation forms corresponding to the daily indoor scenario can include the presentation forms such as long videos, short videos, long voices, short voices, long text and the like.

In another example, the application scenario is an outdoor sports scenario, and the corresponding content presentation form list can include long voices, short voices, and short text.

It may be understood that the list of content presentation forms corresponding to the application scenario can be set in advance, or can be user-defined, or can be extracted based on the actual usage process of the user.

The content presentation forms corresponding to the application scenario can be listed first, based on the list of the content presentation forms corresponding to the application scenario extracted in the actual usage process of the user, and the list of the content presentation forms includes more content presentation forms. During the usage process of the user, the list of the content presentation forms corresponding to the application scenario is determined based on the usage frequency of the content presentation forms corresponding to the application scenario and the preferences of the user.

The list of the content presentation forms corresponding to the application scenario established in the foregoing way can also be updated based on the actual usage process of the user.

During the usage process of the user, based on the usage frequency of the content presentation forms corresponding to the application scenario and the preferences of the user, the content presentation form list corresponding to the application scenario is updated.

For example, if a content presentation form with a relatively high usage frequency corresponding to the current application scenario is not included in the list of the content presentation forms corresponding to the application scenario, the content presentation form can be added to the list of the content presentation forms corresponding to the application scenario. For a content presentation form with a relatively low usage frequency corresponding to the current application scenario, the content presentation form can be excluded from the list of the content presentation forms corresponding to the current application scenario as required.

In some embodiments, the priority of respective content presentation forms supported by the presentation device is determined, and the content presentation form with the highest priority is determined as the content presentation form supported by the presentation device.

In some embodiments of the present disclosure, the priority of the content presentation form can be determined based on the usage time of the device, the usage habits of the user, the control information of the user, and the like. The priority of respective content presentation forms supported by the device can be different, and the content presentation form with the highest priority is determined as the current content presentation form in accordance with the priority of respective content presentation forms. For example, when the usage time is non-night rest time, the device is the speaker with display screen, and when a song is played, the presentation form of video playback has the higher priority, and the audio playback has the second priority. When the usage time is nighttime, and the user plays a song, in order to prevent the user from being affected by the light of the video playback, the presentation form that the speaker with display screen plays the audio of the song has the higher priority, and the video playback of the song has the second priority.

It may be understood that, in the embodiments of the present disclosure, when the content predetermined by the cloud or the edge-side device is presented in accordance with a priority of each content presentation form, if there is no predetermined presentation content corresponding to the content presentation form with the highest priority, the predetermined presentation content in the content presentation form with the second highest priority is presented in an order of priority from highest to lowest, so that the device presents the content more flexibly, the intelligence level is high, and the user need is better satisfied.

In some embodiments, the number of devices that need to present content is multiple. The content presentation form with the highest priority includes multiple content presentation forms. The number of devices that need to present content can be multiple, when the content presentation form with the highest priority is determined as the current content presentation form in accordance with the priority of each content presentation form, the content presentation form with the highest priority includes multiple content presentation forms. That is, multiple devices that need to present content present the current content respectively in accordance with their corresponding content presentation forms with the highest priority. For example, when the devices that need to present content are the smart album and the smart speaker, among the content presentation forms supported by the smart album, the content presentation form with the highest priority is playing long videos, and among the content presentation forms supported by the smart speaker, the content presentation form with the highest priority is playing long audios. That is, the content presentation forms with the highest priority include playing long videos and playing long audios. Based on the predetermined presentation content, the smart album plays the long videos, the smart speaker plays the long audios, and the presentation forms of the long videos and the long audios are presented at the same time.

It may be understood that, the present disclosure does not limit the priorities of content presentation forms among multiple content presentation forms of multiple devices, that is, the content presentation forms of different priorities of different devices can be combined. Still taking the above-mentioned devices that need to present content as the smart album and the smart speaker as an example, among the content presentation forms supported by the smart speaker, the content presentation form with the highest priority is playing long audios, and the content presentation form with a priority lower than the highest priority is playing short videos.

When the smart speaker cannot obtain the predetermined long video content presentation form with the highest priority, it can perform the short video presentation form with the second highest priority, and at this time, the smart speaker plays in the long audio presentation form with the highest priority, the short video presentation form and the long audio presentation form are combined and are presented simultaneously, which enables the content presentation forms to be more diverse, and further enhances the user experience.

Figure 2:
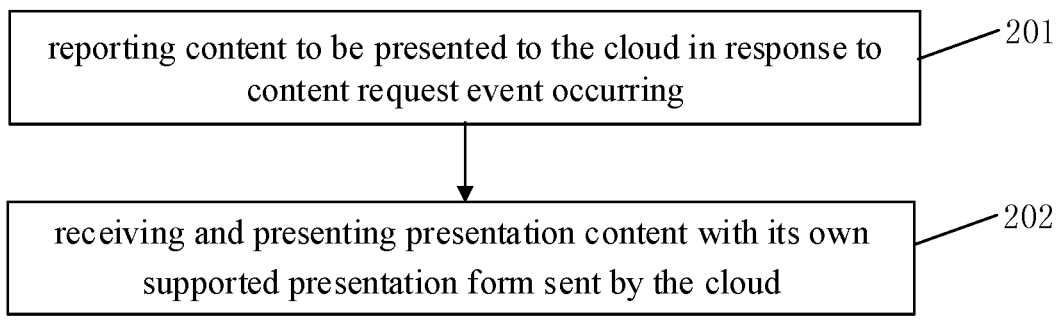
FIG. 2 is a flowchart showing a method for controlling devices to present content according to some other exemplary embodiments of the present disclosure.

FIG. 2 is a flowchart showing a method for controlling devices to present content according to some other exemplary embodiments of the present disclosure, as shown in FIG. 2, a method for controlling devices to present content is provided, and the method for controlling devices to present content includes:

In step S201, the content to be presented is reported to the cloud in response to a content request event occurring.

When a presentation device needs to present content, it issues a content request. The device can be one or more. The cloud or the edge-side device determines the content that the device needs to present in response to that the content request event occurs.

It can be that the device is initiated, waked up and started by the user to issue a content request. It can also be that the smart home system detects changes in the position of the user and usage status, switches from the previous device to the current device, and the current device issues a content request.

In step S202, the presentation content with its own supported presentation form sent by the cloud is received and presented.

The presentation device performs presentation based on the presentation content with its own supported presentation form to enhance the user experience.

Figure 3:
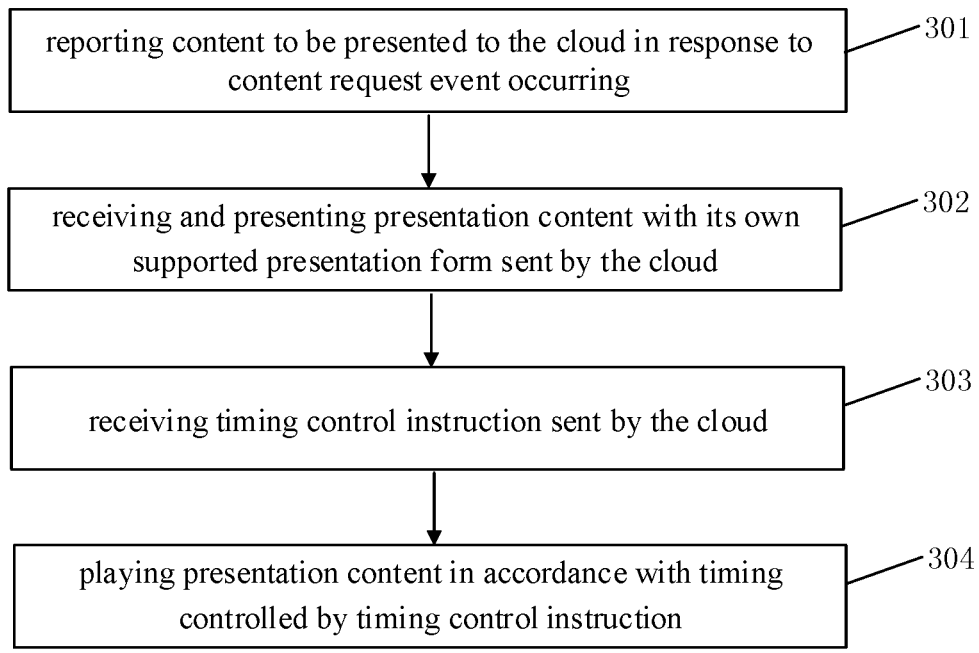
FIG. 3 is a flowchart showing a method for controlling devices to present content according to some other exemplary embodiments of the present disclosure.

FIG. 3 is a flowchart showing a method for controlling devices to present content according to some other exemplary embodiments of the present disclosure, and as shown in FIG. 3, the method for controlling devices to present content includes:

In step S301, the content to be presented is reported to the cloud in response to a content request event occurring.

In step S302, the presentation content with its own supported presentation form sent by the cloud is received and presented.

In step S303, a timing control instruction sent by the cloud is received.

It may be referred to as timing control to apply temporal control to an operation signal. The timing control instruction sent by the cloud is received, and the presentation content is presented in different presentation forms. When there are at least two presentation devices, the presentation content is presented in different presentation forms to implement synchronous presentation of the presentation content.

In step S304, the presentation content is played in accordance with the timing controlled by the timing control instruction.

The execution process for the timing control instruction by the presentation device is performed in chronological order, that is, the presentation content in different presentation forms is presented by the presentation device in chronological order. The timing control instruction provides various operation timing signals to the presentation device, so that the presentation device performs the content presentation based on the presentation timing control instruction.

Figure 4:
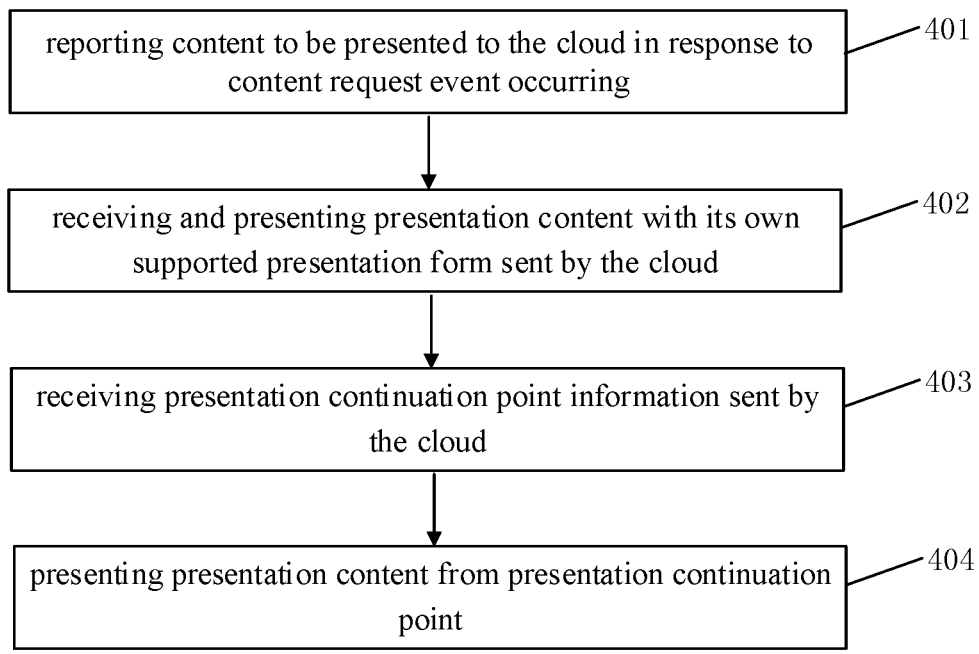
FIG. 4 is a flowchart showing a method for controlling devices to present content according to some other exemplary embodiments of the present disclosure.

FIG. 4 is a flowchart showing a method for controlling devices to present content according to some other exemplary embodiments of the present disclosure, and as shown in FIG. 4, the method for controlling devices to present content includes:

In step S401, the content to be presented is reported to the cloud in response to a content request event occurring.

In step S402, the presentation content with its own supported presentation form sent by the cloud is received and presented.

In step S403, the presentation successive point information sent by the cloud is received.

The cloud or the edge-side device can determine the successive point when the presentation content is presented continuously through the playback status of the presentation device before mobile switching, and then the presentation device after mobile switching performs continuous playback from the playback point of the presentation device before mobile switching, and receives the presentation successive point information sent by the cloud to implement continuous presentation of the content in different presentation forms.

In step S404, the received presentation content is presented from the presentation successive point.

Figure 5:
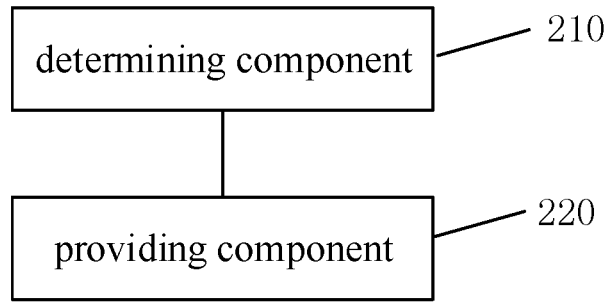
FIG. 5 is a block diagram of an apparatus for controlling devices to present content according to some exemplary embodiments of the present disclosure.

FIG. 5 is a block diagram of an apparatus for controlling devices to present content according to some exemplary embodiments of the present disclosure. As shown in FIG. 5, a device 200 for controlling devices to present content includes a determining component 210 and a providing component 220.

The determining component 210 is configured to determine the content to be presented, in response to a content request event occurring, by the cloud or the router.

The determining component 210 is further configured to determine a content presentation form supported by the presentation device.

The providing component 220 is configured to provide corresponding presentation content to the presentation device in accordance with the determined presentation form.

Figure 6:
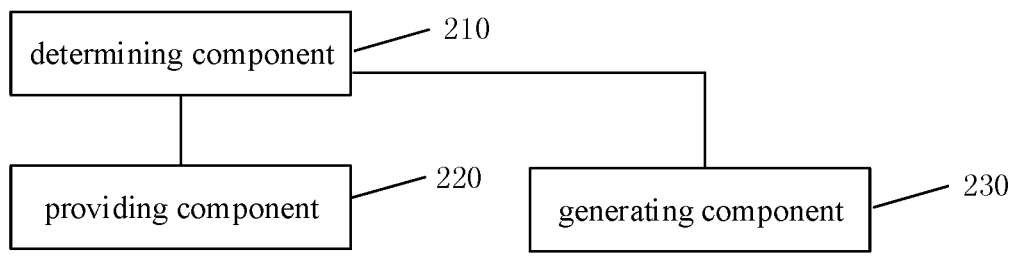
FIG. 6 is a block diagram of an apparatus for controlling devices to present content according to some other exemplary embodiments of the present disclosure.

FIG. 6 is a block diagram of an apparatus for controlling devices to present content according to yet some other exemplary embodiments of the present disclosure. As shown in FIG. 6, the device 200 for controlling devices to present content further includes a generating component 230.

The determining component 210 is further configured to determine at least one content presentation form corresponding to an application scenario based on the application scenario in which the user is currently located.

The generating component 230 is configured to generate presentation content corresponding respectively to at least one content presentation form; or send the content to be presented to the edge-side device and generate the presentation content corresponding respectively to the at least one content presentation form by the edge-side device; or generate the presentation content corresponding respectively to the at least one content presentation form and send the generated presentation content to the edge-side device, wherein the edge-side device includes a device through which the presentation device is networked.

The providing component 220 is configured to determine the presentation content corresponding to the content presentation form supported by the presentation device from the generated presentation content corresponding respectively to the at least one content presentation form. And the determined presentation content is provided to the presentation device.

In some embodiments, there are included at least two responsive presentation devices responsive to content requests.

The determining component 210 determines the content presentation form supported by the presentation device in the following manner: determining the presentation forms which are set in advance and corresponding respectively to when the at least two presentation devices cooperate to present the content.

The providing component 220 provides the corresponding presentation content to the presentation device in accordance with the determined presentation form in the following manner: determining the presentation content corresponding to the content presentation forms corresponding respectively to the at least two presentation devices from the generated presentation content corresponding respectively to the at least one content presentation form, based on the determined content presentation forms corresponding respectively to the at least two presentation devices, and providing the same correspondingly to the at least two presentation devices.

In some embodiments, the providing component 220 is further configured to provide respectively presentation timing control instructions to the at least two presentation devices, so that the at least two presentation devices implement synchronous presentation of the presentation content in different presentation forms.

In some embodiments, the determining component 210 is further configured to determine a successive point when the presentation device after user mobile switching presents continuously the content presented by the presentation device before mobile switching in response to that a user mobile switching event occurs during a response to the content request after a content request event occurred, wherein the mobile switching event includes space switching and/or application scenarios switching.

The providing component 220 is further configured to provide the presentation content from the successive point to the presentation device after user mobile switching in accordance with the content presentation form supported by the presentation device after user mobile switching, or provide the presentation content to the presentation device after user mobile switching in accordance with the content presentation form supported by the presentation device after user mobile switching, and control the presentation device after user mobile switching to present the provided presentation content from the successive point.

In some embodiments, the determining component 210 is further configured to determine at least one content presentation form corresponding to the application scenario after switching based on the application scenario after user switching prior to providing the presentation content to the presentation device after switching, with regard to a case that the mobile switching is an application scenario switching, and generate the presentation content corresponding respectively to the at least one content presentation form corresponding to the application scenario after switching.

Alternatively, in response to that there is a content presentation form that does not exist in the content presentation form corresponding to the application scenario before switching, in the at least one determined content presentation form, a corresponding form of presentation content is generated for the content presentation form that does not exist.

In some embodiments, the determining component 210 determines the priority of each content presentation form supported by the presentation device, and determines the content presentation form with the highest priority as the content presentation form supported by the presentation device.

Figure 7:
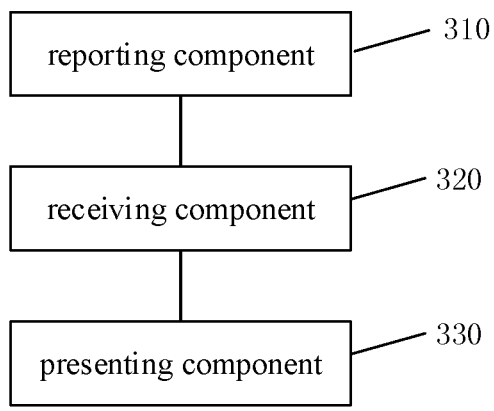
FIG. 7 is a block diagram of an apparatus for controlling devices to present content according to some exemplary embodiments of the present disclosure.

FIG. 7 is a block diagram of an apparatus for controlling devices to present content according to some exemplary embodiments of the present disclosure. As shown in FIG. 7, an apparatus 300 for controlling a device to present content includes a reporting component 310, a receiving component 320, and a presenting component 330.

The reporting component 310 is configured to report the content to be presented to the cloud, by means of that the presentation device side is in response to a content request event occurring.

The receiving component 320 is configured to receive the presentation content with its own supported presentation form sent by the cloud.

The presenting component 330 is configured to present the presentation content.

The receiving component 320 is further configured to receive the timing control instructions sent by the cloud. The presenting component 330 is configured to present synchronously the presentation content in accordance with a timing controlled by the timing control instructions.

In some embodiments, the receiving component 320 is further configured to receive the presentation successive point information sent by the cloud.

The presenting component 330 is further configured to present the received presentation content from the presentation successive point.

With respect to the devices in the above embodiments, the manners for performing operations for individual modules therein have been described in detail in the embodiments regarding the method, which will not be elaborated herein.

Figure 8:
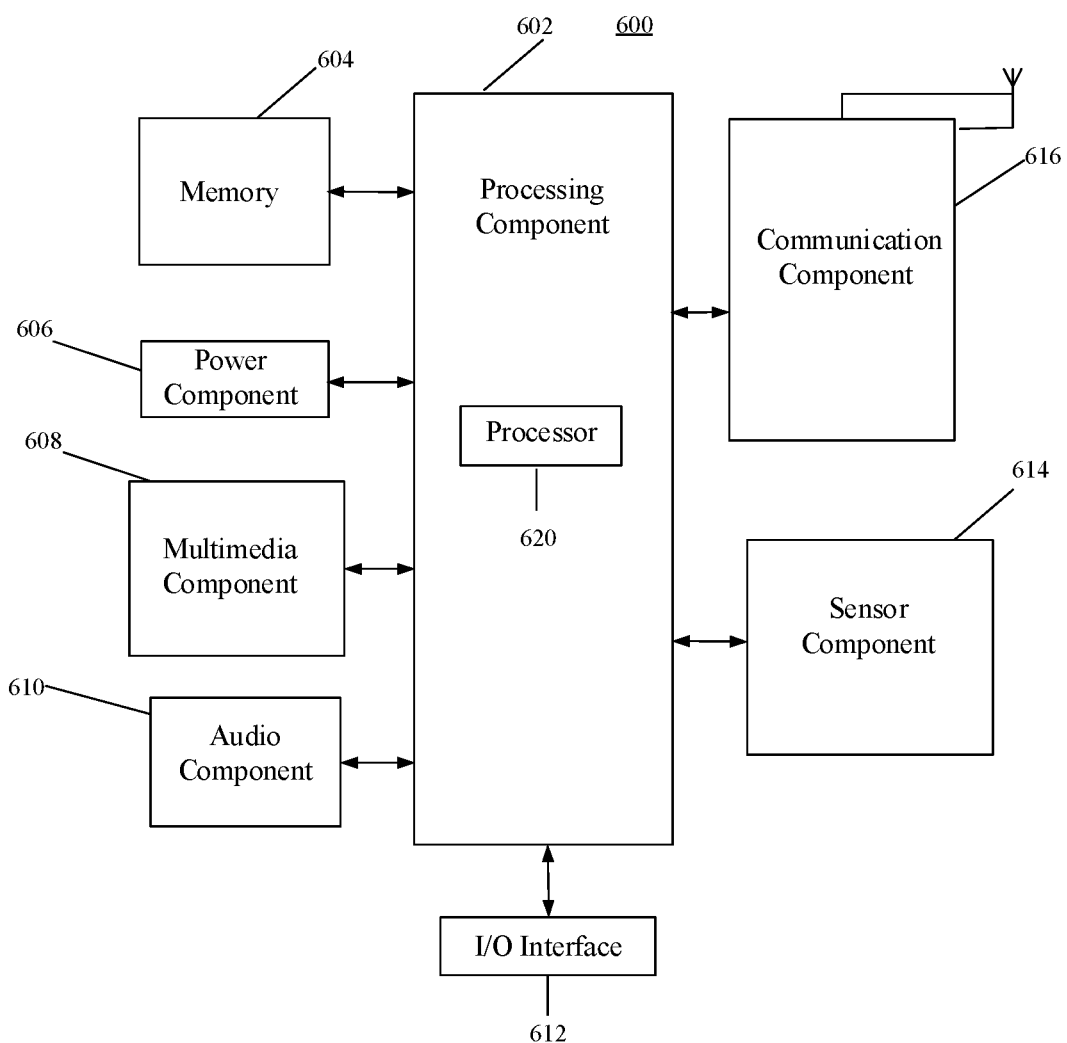
FIG. 8 is a block diagram of an apparatus for controlling devices to present content according to some exemplary embodiments.

FIG. 8 is a block diagram of an apparatus for controlling devices to present content according to some exemplary embodiments. For example, an apparatus 600 for controlling devices to present content can be a mobile phone, a computer, a digital broadcast terminal, a messaging device, a gaming console, a tablet, a medical device, exercise equipment, a personal digital assistant, and the like.

Referring to FIG. 8, the apparatus 600 for controlling devices to present content can include one or more of the following components: a processing component 602, a memory device 604, a power component 606, a multimedia component 608, an audio component 610, an input/output (I/O) interface 612, a sensor component 614, and a communication component 616.

The processing component 602 typically controls overall operations of the apparatus 600 for controlling devices to present content, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules which facilitate the interaction between the processing component 602 and other components. For instance, the processing component 602 can include a multimedia module to facilitate the interaction between the multimedia component 608 and the processing component 602.

The memory device 604 is configured to store various types of data to support the operation of the apparatus 600 for controlling devices to present content. Examples of such data include instructions for any applications or methods operated on the apparatus 600 for controlling devices to present content, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600 for controlling devices to present content. The power component 606 can include a power management system, one or more power sources, and any other components associated with the generation, management, and distribution of power in the apparatus 600 for controlling devices to present content.

The multimedia component 608 includes a screen providing an output interface between the apparatus 600 for controlling devices to present content and the user. In some embodiments, the screen can include a liquid crystal display (LCD) and a touch panel (TP). In some embodiments, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and the rear camera can receive an external multimedia datum while the apparatus 600 for controlling devices to present content is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone ("MIC") configured to receive an external audio signal when the apparatus 600 for controlling devices to present content is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons can include, but are not limited to, a home button, a volume button, a starting button, and a locking button.

The sensor component 614 includes one or more sensors to provide status assessments of various aspects of the apparatus 600 for controlling devices to present content. For instance, the sensor component 614 can detect an open/closed status of the apparatus 600 for controlling devices to present content, relative positioning of components, e.g., the display and the keypad, of the apparatus 600 for controlling devices to present content, a change in position of the apparatus 600 for controlling devices to present content or a component of the apparatus 600 for controlling devices to present content, a presence or absence of user contact with the apparatus 600 for controlling devices to present content, an orientation or an acceleration/deceleration of the apparatus 600 for controlling devices to present content, and a change in temperature of the apparatus 600 for controlling devices to present content. The sensor component 614 can include a proximity sensor configured to detect the presence of nearby objects without any physical contact. The sensor component 614 can also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate communication, wired or wirelessly, between the apparatus 600 for controlling devices to present content and other devices. The apparatus 600 for controlling devices to present content can access a wireless network based on a communication standard, such as Wi-Fi, 2G, 3G, 4G, 5G and a combination thereof. In some exemplary embodiments, the communication component 616 receives a broadcast signal or broadcast associated information from an external broadcast management system via a broadcast channel. In some exemplary embodiments, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some exemplary embodiments, the apparatus 600 for controlling devices to present content can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some exemplary embodiments, there is also provided a non-transitory computer-readable storage medium including instructions, such as included in the memory 604, executable by the processor 620 in the apparatus 600 for controlling devices to present content, for performing the above-described methods. For example, the computer-readable storage medium can be a ROM, a random access memory (RAM), a CD-ROM, a magnetic tape, a floppy disc, an optical data storage device, and the like.

Various embodiments of the present disclosure can have one or more of the following advantages. The presentation content can be determined in advance according to the content presentation form supported by the presentation device. When it is determined that a content request event occurs, the corresponding presentation content can be provided to the presentation device in accordance with the determined presentation form, and the content in different presentation forms is continuously presented, thereby the user experience is enhanced.

It may be understood that the singular forms "a," "an," and "the" in the disclosure are intended to include the plural forms unless the content clearly indicates otherwise.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for controlling devices to present content in a smart home system, comprising:
   determining content to be presented by a cloud, based on changes in user application scenarios and usage status, in response to a content request event occurring;
   determining a content presentation form supported by a current presentation device based on its own presentation capability, among various content presentation forms including video playing and audio playing; and
   providing corresponding presentation content to the current presentation device in accordance with a determined presentation form,
   wherein the method further comprises:
   setting in advance by the cloud, based on various application scenarios where users are located, at least one of content presentation forms corresponding to the application scenarios, and establishing a list of the content presentation forms corresponding to the application scenarios; and
   determining in advance the presentation content based on the list of content presentation forms, and directly issuing, by the cloud, the determined presentation content to the presentation device by using calculation capability of the cloud.

2. The method for controlling devices to present content according to claim 1, further comprising:
   determining at least one content presentation form corresponding to an application scenario based on the application scenario in which the user is currently located; and
   performing at least one of:
   generating presentation content corresponding respectively to the at least one content presentation form;
   sending content to be presented to an edge-side device and generating presentation content corresponding respectively to the at least one content presentation form by the edge-side device; and
   generating presentation content corresponding respectively to the at least one content presentation form and sending the generated presentation content to an edge-side device,
   wherein the edge-side device comprises a device through which the presentation device is networked.

3. The method for controlling devices to present content according to claim 2, wherein the providing corresponding presentation content to the presentation device in accordance with a determined presentation form comprise:
   determining presentation content corresponding to a content presentation form supported by the presentation device from the generated presentation content corresponding respectively to at least one content presentation form; and
   providing the determined presentation content to the presentation device.

4. The method for controlling devices to present content according to claim 2, wherein there are included at least two presentation devices responsive to content requests, and the determining content presentation form supported by presentation device comprises:
   determining presentation forms which are set in advance and corresponding respectively to when the at least two presentation devices cooperate to present the content; and
   the providing corresponding presentation content to the presentation device in accordance with the determined presentation form comprises:
   determining presentation content corresponding to content presentation forms corresponding respectively to at least two presentation devices, from the generated presentation content corresponding respectively to at least one content presentation form, based on the determined content presentation forms corresponding respectively to the at least two presentation devices, and correspondingly providing to the at least two presentation devices.

5. The method for controlling devices to present content according to claim 4, wherein the method further comprises:
providing respectively presentation timing control instructions to the at least two presentation devices, to make the at least two presentation devices implement synchronous presentation of presentation content in different presentation forms.

6. The method for controlling devices to present content according to claim 1, wherein in response to that a user mobile switching event occurs during a response to the content request after the content request event occurred, the method further comprises:
determining a successive point when a presentation device after user mobile switching presents continuously content presented by a presentation device before mobile switching, wherein mobile switching event comprises space switching and/or application scenarios switching; and
performing at least one of:
providing presentation content from the successive point to the presentation device after user mobile switching, in accordance with a content presentation form supported by the presentation device after user mobile switching; and
providing presentation content to the presentation device after user mobile switching in accordance with a content presentation form supported by the presentation device after user mobile switching, and controlling the presentation device after user mobile switching to present the provided presentation content from the successive point.

7. The method for controlling devices to present content according to claim 6, wherein for a case that mobile switching is an application scenario switching, before providing the presentation content to the presentation device after switching, the method further comprises:
determining at least one content presentation form corresponding to the application scenario after switching, based on application scenario after user switching; and
performing at least one of:
generating presentation content corresponding respectively to at least one content presentation form corresponding to the application scenario after switching; and
generating a corresponding form of presentation content for a content presentation form that does not exist, in response to that there is the content presentation form that does not exist in content presentation forms corresponding to application scenario before switching, in the at least one determined content presentation form.

8. The method for controlling devices to present content according to claim 1, wherein the determining a content presentation form supported by a presentation device comprises:
determining a priority of each content presentation form supported by the presentation device; and
determining a content presentation form with the highest priority as a content presentation form supported by the presentation device.

9. An Artificial Intelligence Internet of Things (AIoT) system implementing the method of claim 1, comprising a plurality of presentation devices including the presentation device, wherein:
presentation contents are determined in advance according to content presentation forms supported by the plurality of presentation devices; and
the determined presentation contents in different presentation forms are continuously presented.

10. The AIoT system of claim 9, wherein:
the plurality of presentation devices include at least one of a smart speaker, a smart watch, a smart bracelet, a mobile phone, an in-vehicle navigation device, a television;
the plurality of presentation devices are configured to be connected to at least one of a Wi-Fi network and a mobile network;
the system is configured to:
determine user application scenarios based on positions of the user;
determine transition points in the presentation contents when the presentation contents are continuously presented during switching among devices, networks, and application scenarios;
automatically switch among presentation devices and corresponding presentation forms to present associated contents continuously; and
determine the presentation contents in advance based on a list of content presentation forms including at least two of audio files, video files, track information, songwriter, lyrics information, audios of different lengths, videos of different lengths, voices of different lengths, and text information corresponding to a present content, such that the present content in the corresponding presentation form is directly issued to a second device after switching from a first device without first generating content for the second device.

11. A method for controlling devices to present content in a smart home system, comprising:
reporting content to be presented to a cloud, in response to a content request event occurring; and
receiving and presenting presentation content with its own supported presentation form, sent by the cloud,
wherein the method further comprises:
setting in advance, based on various application scenarios where users are located, at least one of content presentation forms corresponding to the application scenarios, and establishing a list of the content presentation forms corresponding to the application scenarios; and
determining in advance the presentation content based on the list of content presentation forms, and providing the determined presentation content directly by using calculation capability of the cloud.

12. The method for controlling devices to present content according to claim 11, further comprising:
receiving a timing control instruction sent by the cloud; and
presenting synchronously presentation content in accordance with timing controlled by the timing control instruction.

13. The method for controlling devices to present content according to claim 11, further comprising:
receiving presentation successive point information sent by the cloud; and
presenting the presentation content from the presentation successive point.

14. An apparatus for controlling devices to present content in a smart home system, comprising:
memory storing processor-executable instructions;
a processor configured to:
determine content to be presented, based on changes in user application scenarios and usage status, in response to a content request event occurring, and determine a content presentation form supported by a current presentation device based on its own presentation capability, among various content presentation forms including video playing and audio playing; and provide corresponding presentation content to the current presentation device in accordance with the determined presentation form, wherein the processor is further configured to:

set in advance, based on various application scenarios where users are located, at least one of content presentation forms corresponding to the application scenarios, and establish a list of the content presentation forms corresponding to the application scenarios; and determine in advance the presentation content based on the list of content presentation forms, and directly issuing, by the cloud, prviding the determined presentation content to the presentation device by using calculation capability of the cloud.

15. The apparatus for controlling devices to present content according to claim 14, wherein the processor is further configured to determine at least one content presentation form corresponding to an application scenario, based on the application scenario in which the user is currently located; and the processor is configured to perform at least one of:

generating presentation content corresponding respectively to the at least one content presentation form;

sending content to be presented to an edge-side device, and generate presentation content corresponding respectively to at least one content presentation form by the edge-side device; and generating presentation content corresponding respectively to at least one content presentation form and send the generated presentation content to an edge-side device, wherein the edge-side device comprises a device through which a presentation device is networked.

16. The apparatus for controlling devices to present content according to claim 13, wherein the corresponding presentation content is provided by the processor to the presentation device in accordance with a determined presentation form in the following manner:

determining presentation content corresponding to a content presentation form supported by the presentation device from the generated presentation content corresponding respectively to at least one content presentation form; and providing the determined presentation content to the presentation device.

17. The apparatus for controlling devices to present content according to claim 15, wherein there are included at least two presentation devices responsive to content requests;

content presentation forms supported by presentation device are determined by the processor in the following manner:

determining presentation forms which are set in advance and corresponding respectively to when the at least two presentation devices cooperate to present content; and corresponding presentation content is provided by the processor to the presentation device in accordance with the determined presentation form by:

determining presentation content corresponding to content presentation forms corresponding respectively to at least two presentation devices, from the generated presentation content corresponding respectively to at least one content presentation form, based on the determined content presentation forms corresponding respectively to the at least two presentation devices, and correspondingly providing to the at least two presentation devices.

18. The apparatus for controlling devices to present content according to claim 17, wherein the processor is further configured to provide respectively presentation timing control instructions to the at least two presentation devices, to make the at least two presentation devices implement synchronous presentation of presentation content in different presentation forms.

19. The apparatus for controlling devices to present content according to claim 14, wherein the processor is further configured to:

determine a successive point when a presentation device after user mobile switching presents continuously content presented by a presentation device before mobile switching, in response to that a user mobile switching event occurs during a response to the content request after the content request event occurred, wherein mobile switching event comprises space switching and/or application scenarios switching; and perform at least one of:

providing presentation content from the successive point to the presentation device after user mobile switching, in accordance with a content presentation form supported by the presentation device after user mobile switching, and providing presentation content to the presentation device after user mobile switching in accordance with a content presentation form supported by the presentation device after user mobile switching and control the presentation device after user mobile switching to present the provided presentation content from the successive point.

20. The apparatus for controlling devices to present content according to claim 19, wherein the processor is further configured to:

determine at least one content presentation form corresponding to the application scenario after switching, based on the application scenario after user switching, before providing the presentation content to the presentation device after switching for a case that mobile switching is an application scenario switching; and generate at least one of:

presentation content corresponding respectively to at least one content presentation form corresponding to the application scenario after switching; and a corresponding form of presentation content for a content presentation form that does not exist, in response to that there is the content presentation form that does not exist in content presentation forms corresponding to application scenario before switching, in the at least one determined content presentation form.

* * * * *